(12) United States Patent
Park et al.

(10) Patent No.: US 8,970,341 B2
(45) Date of Patent: Mar. 3, 2015

(54) ELECTRIC VEHICLE, BATTERY CHARGING STATION, BATTERY EXCHANGING RESERVATION SYSTEM COMPRISING THE SAME AND METHOD THEREOF

(75) Inventors: Jun-Seok Park, Seoul (KR); Won-Kyu Kim, Seoul (KR); Hee-Jeing Park, Gunpo-si (KR); Hee-Seok Moon, Asan-si (KR); Wong-Chul Choi, Seoul (KR); Jay-Il Jeong, Seoul (KR); Chi-Man Yu, Bucheon-si (KR); Do-Yang Jung, Anyang-si (KR); Yong-Hark Shin, Seoul (KR); Jae-Hong Park, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 283 days.

(21) Appl. No.: 13/531,938

(22) Filed: Jun. 25, 2012

(65) Prior Publication Data

US 2013/0342310 A1 Dec. 26, 2013

(51) Int. Cl.
*G05B 9/02* (2006.01)
*G05D 1/00* (2006.01)
*B60R 25/00* (2013.01)
*H02J 7/00* (2006.01)
*B23P 19/00* (2006.01)

(52) U.S. Cl.
USPC ............... 340/4.3; 340/5.7; 320/109; 29/730; 29/252; 29/763; 701/1; 701/22; 180/65.21; 180/65.29

(58) Field of Classification Search
CPC .............. G06F 7/00; G06F 17/00; H02J 7/00; G08G 1/00; B60S 5/06; Y02T 90/124; Y02T 10/7005; Y02T 90/16; Y02T 90/162; Y02T 90/163; B60L 1/003; B60L 1/02; B60L 11/184; B60L 11/1846; B60L 2240/72
USPC ............................................. 340/4.3; 320/109
See application file for complete search history.

(56) References Cited

U.S. PATENT DOCUMENTS

2009/0327165 A1* 12/2009 Kaufman ...................... 705/500
2010/0076825 A1* 3/2010 Sato et al. .................... 705/14.1
2010/0141206 A1* 6/2010 Agassi et al. ................. 320/109

(Continued)

FOREIGN PATENT DOCUMENTS

JP 2003-102110 4/2003
JP 2004-066889 A 3/2004

(Continued)

*Primary Examiner* — Fekadeselassie Girma
(74) *Attorney, Agent, or Firm* — Sherr & Jiang, PLLC (57) ABSTRACT

Disclosed is an electric vehicle, a battery charging station, and an electric vehicle battery exchange reservation system including the same. The electric vehicle includes a power level detection unit adapted to detect a power level of a battery mounted on the electric vehicle; a communication unit adapted to communicate with a battery charging station; and a control unit adapted to determine a battery charging station, in which the battery of the electric vehicle is to be exchanged, based on the power level of the battery and a route of travel of the electric vehicle and transmit a battery exchange reservation command to the determined battery charging station. Based on the battery power level of the electric vehicle, a battery charging station existing along the route of travel is requested to provide battery information, and battery exchange is reserved accordingly, so that batteries can be exchanged more efficiently and conveniently.

5 Claims, 10 Drawing Sheets

(56) References Cited

U.S. PATENT DOCUMENTS

2011/0025267 A1* 2/2011 Kamen et al. .................. 320/109
2011/0025268 A1* 2/2011 Davidovitch ................. 320/109
2011/0032110 A1* 2/2011 Taguchi ..................... 340/636.1
2011/0303509 A1* 12/2011 Agassi et al. ................. 198/604

FOREIGN PATENT DOCUMENTS

| JP | 2011-142778 A | 7/2011 |
| JP | 2012-080628 A | 4/2012 |
| WO | WO 2010/115573 A1 | 10/2010 |

* cited by examiner

ELECTRIC VEHICLE, BATTERY CHARGING STATION, BATTERY EXCHANGING RESERVATION SYSTEM COMPRISING THE SAME AND METHOD THEREOF

TECHNICAL FIELD

The present invention relates to reservation of exchange of batteries of electric vehicles, and more particularly, to technology for reserving exchange of batteries of electric vehicles so that the batteries can be exchanged easily, conveniently, and quickly.

BACKGROUND ART

Vehicles are indispensable to everyday living or social activities, and use fossil fuels (e.g. petroleum) as their energy source. However, fossil fuels have limited deposits, which are being depleted as time passes by, and the prices are on the rise.

Particularly, fossil fuels discharge, when used, not only exhaust gases, which contaminate atmosphere environments, but also a large amount of carbon oxide, which is a major cause of global warming. Therefore, there have been global research and development activities to reduce carbon emission throughout the entire industries, and electric vehicles have been developed, which use electricity as their energy source, as a result of such efforts.

Electric vehicles include battery-powered electric vehicles, which are solely powered by electricity, hybrid electric vehicles, which use both motors and engines, and fuel cell electric vehicles. In addition, widespread use of electric vehicles requires construction of a charging infrastructure, which enables easy charging at any time and location, and relevant research is in progress.

However, unlike conventional vehicles using electric vehicles charge their batteries in a plug-in type, meaning that consumers need to wait for a long time, which inconveniences the consumers and degrades economic merits of charging facility operators.

In an attempt to solve the above-mentioned problem, it has recently been proposed that, instead of charging the battery of an electric vehicle, a battery be charged in advance, and the fully-charged battery replace a depleted one (hereinafter, referred to as a battery exchange type).

Such a battery exchange type is advantageous in that, when a consumer visits a charging station to charge the battery, he/she can exchange the depleted battery with a fully-charged one and mount it. This requires no charging time and thus conveniences the consumer.

However, batteries are expensive, and efficient resource utilization requires management of batteries exchanged in charging stations. For example, when vehicles concentrate on a specific charging station, there may not be sufficient batteries, making some consumers visit in vain. In the opposite case, batteries may be left unused for a long period of time.

Furthermore, when battery exchange-type electric vehicles are used as electric buses traveling along a predetermined line, they need charging stations capable of convenient and rapid battery exchange.

DISCLOSURE

Technical Problem

Therefore, the present invention has been made in view of the above-mentioned problems, and an aspect of the present invention is to provide an electric vehicle, a battery charging station, and a system and a method for reserving battery exchange in such a manner that, based on the battery power level of the electric vehicle, a battery charging station existing along the route of travel is requested to provide battery information, which is used to reserve battery exchange, thereby guaranteeing more efficient and convenient battery exchange.

Technical Solution

In accordance with an aspect of the present invention, there is provided an electric vehicle including a power level detection unit adapted to detect a power level of a battery mounted on the electric vehicle; a communication unit adapted to communicate with a battery charging station; and a control unit adapted to determine a battery charging station, in which the battery of the electric vehicle is to be exchanged, based on the power level of the battery and a route of travel of the electric vehicle and transmit a battery exchange reservation command to the determined battery charging station.

The control unit may be adapted to monitor a traveling distance of the electric vehicle based on the battery power level, communicate with a battery charging station corresponding to the route of travel of the electric vehicle to acquire information regarding whether the battery of the electric vehicle can be exchanged or not, and determine the battery charging station in which the battery of the electric vehicle is to be exchanged.

In accordance with another aspect of the present invention, there is provided an electric vehicle including a power level detection unit adapted to detect a power level of a battery mounted on the electric vehicle; a user input unit adapted to enable user input; a communication unit adapted to communicate with a battery charging station; and a control unit adapted to recommend a battery charging station, in which the battery of the electric vehicle can be exchanged, to the user based on the power level of the battery and a route of travel of the electric vehicle and transmit a battery exchange reservation command to the battery charging station selected by the user.

The control unit may be adapted to monitor a traveling distance of the electric vehicle based on the battery power level, communicate with a battery charging station corresponding to the route of travel of the electric vehicle to acquire information regarding whether the battery of the electric vehicle can be exchanged or not, and recommend a battery charging station, in which the battery of the electric vehicle can be exchanged, to the user.

The control unit may be adapted to provide the user with a charging request message when the power level of the battery is below a threshold.

The communication unit may be adapted to communicate with an external source and acquire information regarding traffic conditions along the route of travel, and the control unit may be adapted to calculate the traveling distance based on the traffic conditions and the battery power level.

The control unit may be adapted to transmit information regarding the battery mounted on the electric vehicle to the battery charging station and request the battery charging station to confirm whether there exists a battery that can be mounted on the electric vehicle or not.

The electric vehicle includes an electric bus traveling along a line, the battery charging station is installed at a bus stop, and the control unit is adapted to select the battery charging station, which corresponds to the traveling line of the electric bus, as a reservation target.

In accordance with another aspect of the present invention, there is provided an electric vehicle battery charging station including a battery storage unit adapted to contain a chargeable battery mounted on a battery mounting module of an electric vehicle; a database unit adapted to store information regarding the type, amount, and charging state of the battery contained in the battery storage unit and reservation particulars; a communication unit adapted to communicate with the electric vehicle; and a reservation management unit adapted to extract information regarding a reservable battery from the database, provide the electric vehicle with the extracted information, receive a reservation command from the electric vehicle, and update reservation information in the database unit.

In accordance with another aspect of the present invention, there is provided an electric vehicle battery exchange reservation system including an electric vehicle including a power level detection unit adapted to detect a power level of a battery mounted on the electric vehicle, a communication unit adapted to communicate with a battery charging station, and a control unit adapted to determine a battery charging station, in which the battery of the electric vehicle is to be exchanged, based on the power level of the battery and a route of travel of the electric vehicle and transmit a battery exchange reservation command to the determined battery charging station; and a battery charging station including a battery storage unit adapted to contain a chargeable battery mounted on the electric vehicle, a database unit adapted to store information regarding the type, amount, and charging state of the battery contained in the battery storage unit and reservation particulars, a communication unit adapted to communicate with the electric vehicle, and a reservation management unit adapted to extract information regarding a reservable battery corresponding to the battery already mounted on the electric vehicle from the database unit, provide the electric vehicle with the extracted information, receive a reservation command from the electric vehicle, and update reservation information in the database unit.

The electric vehicle includes an electric bus traveling along a line, the battery charging station is installed at a bus stop, and the control unit is adapted to select the battery charging station, which corresponds to the traveling line of the electric bus, as a reservation target.

In accordance with another aspect of the present invention, there is provided a method of reserving exchange of a battery of an electric vehicle, including the steps of detecting a power level of a battery mounted on an electric vehicle; asking, by the electric vehicle, a battery charging station, which exists along a route of travel, whether exchange reservation is possible or not; confirming, by the battery charging station, whether reservation of a battery mountable on the electric vehicle is possible or not and transmitting a reply to the electric vehicle; requesting, by the electric vehicle, the battery charging station to reserve battery exchange, when the battery charging station has replied that reservation is possible, and providing the user with reservation information; and updating, by the battery charging station, battery exchange reservation information.

The method of reserving exchange of a battery of an electric vehicle may further include the steps of confirming, by the battery charging station, whether the electric vehicle, when entering into the battery charging station, has made reservation or not based on identification information regarding the electric vehicle; transmitting an entry grant signal to the electric vehicle when reservation information regarding the electric vehicle exists; confirming an entry position, when the electric vehicle enters into the battery charging station, and transmitting a confirmation signal to the electric vehicle; opening a door of a battery mounting module installed on top of the electric vehicle; sealing the battery mounting module by lowering a protection guide installed in the battery charging station; and exchanging the battery.

The method of reserving exchange of a battery of an electric vehicle may further include the steps of confirming, by the battery charging station, whether the electric vehicle, when entering into the battery charging station, has made reservation or not based on identification information regarding the electric vehicle; transmitting an entry grant signal to the electric vehicle when reservation information regarding the electric vehicle exists; confirming an entry position, when the electric vehicle enters into the battery charging station, and transmitting a confirmation signal to the electric vehicle; sealing the battery mounting module by lowering a protection guide installed in the battery charging station; opening a door of a battery mounting module installed on top of the electric vehicle; and exchanging the battery.

Advantageous Effects

The electric vehicle, the battery charging station, and the system and method for reserving battery exchange according to the present invention are advantageous in that, based on the battery power level of the electric vehicle, a battery charging station existing along the route of travel is requested to provide battery information, which is used to reserve battery exchange, so that batteries can be exchanged more efficiently and conveniently.

MODE FOR CARRYING OUT THE INVENTION

Figure 1:
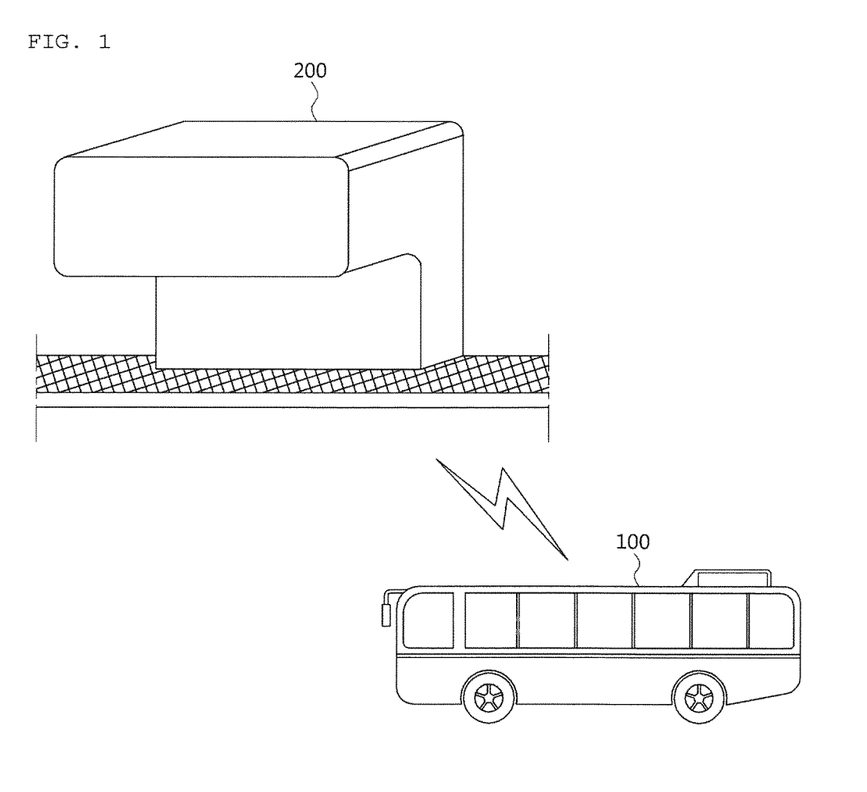
FIG. 1 is a schematic view of a system for reserving exchange of batteries of electric vehicles according to a first embodiment of the present invention.
Figure 2:
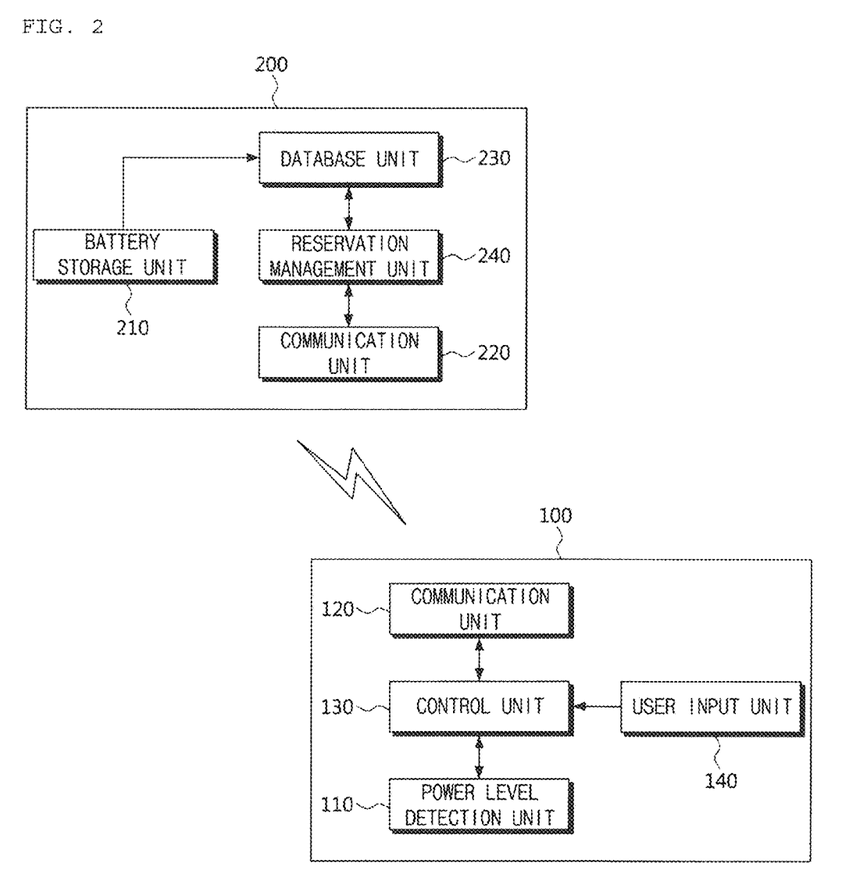
FIG. 2 is a schematic control block diagram of the system for reserving exchange of batteries of electric vehicles shown in FIG. 1.

FIG. 1 is a schematic view of a system for reserving exchange of batteries of electric vehicles according to a first embodiment of the present invention, and FIG. 2 is a schematic control block diagram of the system for reserving exchange of batteries of electric vehicles shown in FIG. 1.

Referring to FIGS. 1 and 2, a system for reserving exchange of a battery of an electric vehicle 100 according to a first embodiment of the present invention includes an electric vehicle 100 and a battery charging station 200.

The electric vehicle 100 according to the present embodiment includes a power level detection unit 110, a communication unit 120, and a control unit 130.

The power level detection unit 110 is adapted to detect the power level of the battery mounted on the electric vehicle 100, and can be implemented by a battery voltage/current measurement sensor and a power level calculation algorithm. For example, the battery power level is calculated by measuring the voltage of the battery and applying a prediction model in connection with pre-stored correlation between the voltage and power level.

The communication unit 120 is adapted to enable communication between the electric vehicle 100 and an external device, and can be implemented by a wireless communication module. Various wireless communication schemes, including CDMA, can be employed for wireless communication by the communication unit 120.

The control unit 130 is adapted to interwork with the power level detection unit 110 and the communication unit 120 so that, based on the battery power level, it communicates with a battery charging station 200 existing along the route of travel and reserve battery exchange, and can be implemented by a processor, a controller, and a control command.

The operation process of the control unit 130 can be variously programmed depending on the user (driver) convenience and application environment, as will be described later in detail.

Referring to FIG. 2 again, the battery charging station 200 according to the present embodiment includes a battery storage unit 210, a communication unit 220, a database unit 230, and a reservation management unit 240.

The battery storage unit 210 is installed in the battery charging station 200 to store fully-charged and depleted batteries used during battery exchange operations, and can be configured variously, e.g. in a stacking type, in a parallel type, in a combined type of both, etc. The battery storage unit 210 may include a charging module so that batteries can be charged at the location of storage.

The communication unit 220 is adapted to communication with an external device, and can be implemented by a wireless communication module. Various wireless communication schemes, including CDMA, can be employed for wireless communication by the communication unit 220.

The database unit 230 is adapted to store information regarding the type of batteries stored in the battery storage unit 210, their amount, charging state, and reservation particulars, and can be implemented by various storage media.

The reservation management unit 240 is adapted to interwork with the communication unit 220 and the database unit 230 so as to extract information regarding reservable batteries from the database, provide the electric vehicle 100 with the extracted information, receive a reservation command from the electric vehicle 100, process the reservation, and update information in the database unit 230, and can be implemented by a processor, a controller, and a control command.

Figure 3:
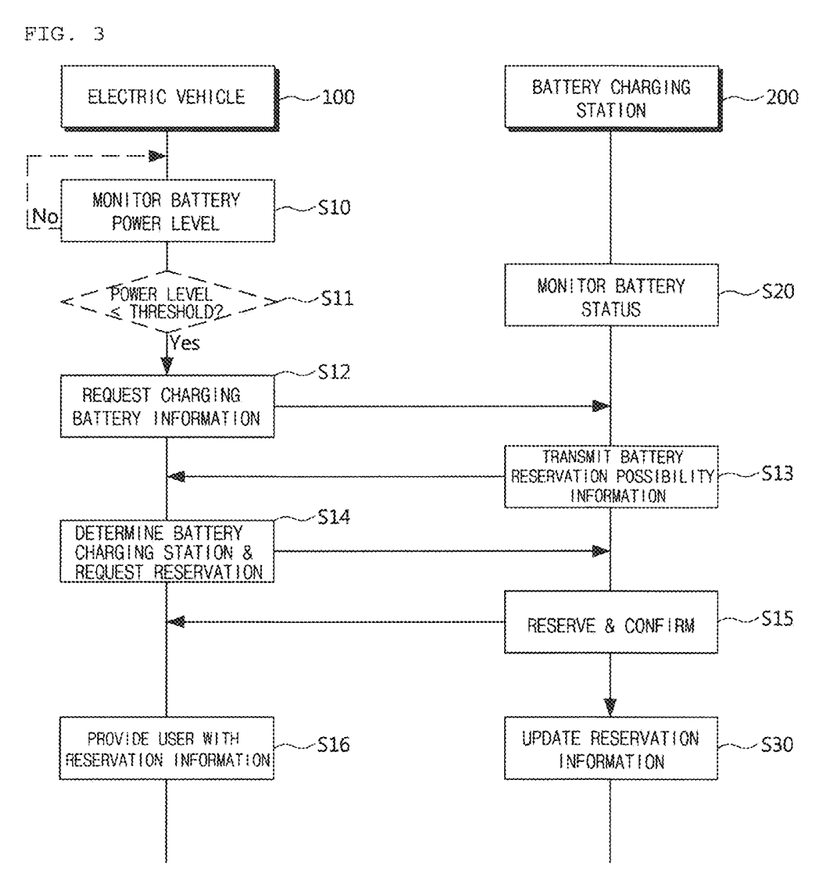
FIG. 3 is a flowchart of a battery exchange method in connection with an electric vehicle and a battery charging station according to the first embodiment of the present invention.

FIG. 3 is a flowchart of a battery exchange method in connection with an electric vehicle 100 and a battery charging station 200 according to the first embodiment of the present invention.

Referring to FIG. 3, the electric vehicle 100 monitors the power level of the mounted battery (S10). The electric vehicle 100 may show the battery power level on the display so that the driver is informed of it. The electric vehicle 100 may also calculate the estimated traveling distance based on the battery power level and inform the user of it. Besides the battery power level, the current traffic condition may also be considered to calculate the estimated traveling distance.

The battery charging station 200 monitors the type of batteries stored in the battery storage unit 210, their amount, charging state, etc. and update relevant information in the database (S20). The battery status information in the database unit 230 can be updated automatically based on interworking with the battery storage unit 210 or a separate battery charging management module (not shown) or, if necessary, updated by the administrator.

The electric vehicle 100 requests a battery charging station 200, which exists along the route of travel, to provide battery information, based on the battery power level (S12).

For example, the electric vehicle 100 can be programmed so that, when the battery power level drops below a threshold (S11), it automatically requests a battery charging station 200, which exists along the route of travel of the electric vehicle 100, to provide information regarding whether the battery can be exchanged or not, etc. For example, the electric vehicle 100 can be programmed to automatically reserve battery exchange when the battery power level is below 15% or 10%.

The electric vehicle 100 can be set up to request only one charging station, which is closest along the route of travel, to provide information or request a number of charging stations existing along the route of travel to provide the same information. The electric vehicle 100 transmits information regarding its identification, information regarding the type of the mounted battery, etc. to the battery charging station 200.

The battery charging station 200, in response to the information request of the electric vehicle 100, extracts battery status information stored in the database unit 230 and transmits the information to the electric vehicle 100 (S13). For example, the battery charging station 200 transmits information regarding whether battery exchange reservation is possible or not, which is inquired by the electric vehicle 100, as well as information regarding the number of additional batteries available, to the electric vehicle 100.

The electric vehicle 100 receives information regarding whether reservation is possible or not from the battery charging station 200, determines a charging station, in which the battery is to be exchanged, from reservable charging stations, and transmits a reservation command to the corresponding battery charging station 200 (S14).

The battery charging station 200, upon receiving the reservation command, sets up a reservation to exchange the battery of the corresponding electric vehicle 100 and transmits a confirmation signal to the electric vehicle 100 (S15). The electric vehicle 100 provides the user (driver) with the reservation information (e.g. name and location of the battery charging station 200) to guide the battery exchange. The electric vehicle 100 can also guide the travel to the reserved battery charging station 200.

The battery charging station 200 stores the reservation information in the database unit 230 to update information regarding the battery status and reservation particulars (S20).

As such, a charging station existing along the route of travel is asked about whether the battery, which is mounted on the electric vehicle 100, can be exchanged now or not, based on the battery type, and an exchange reservation can be made based on the reply. This improves user convenience and guarantees efficient battery management/use.

An example of application of the above-mentioned process of FIG. 3 to an electric bus traveling along a predetermined line will now be described with reference to FIG. 3. The battery charging station 200 is installed at a bus stop so that the battery can be exchanged while passengers are getting on or off the bus.

When the battery power level is below a threshold (S11), the electric bus asks a battery charging station 200, which is at the next but stop along the line, whether the battery can be exchanged or not (S12). The electric bus can either ask the closest battery charging station 200 or ask a number of battery charging stations 200, which come after the current location along the line, the same inquiry.

When the electric bus receives a reply regarding whether reservation is possible or not from the battery charging station 200 (S13), it transmits a reservation command to one of the reservable battery charging stations 200 (S14).

The electric bus can determine a battery charging station 200 in various manners: it can select a battery charging station 200 located at the closest next bus stop along the line, or let the user determine it, for example.

Figure 4:
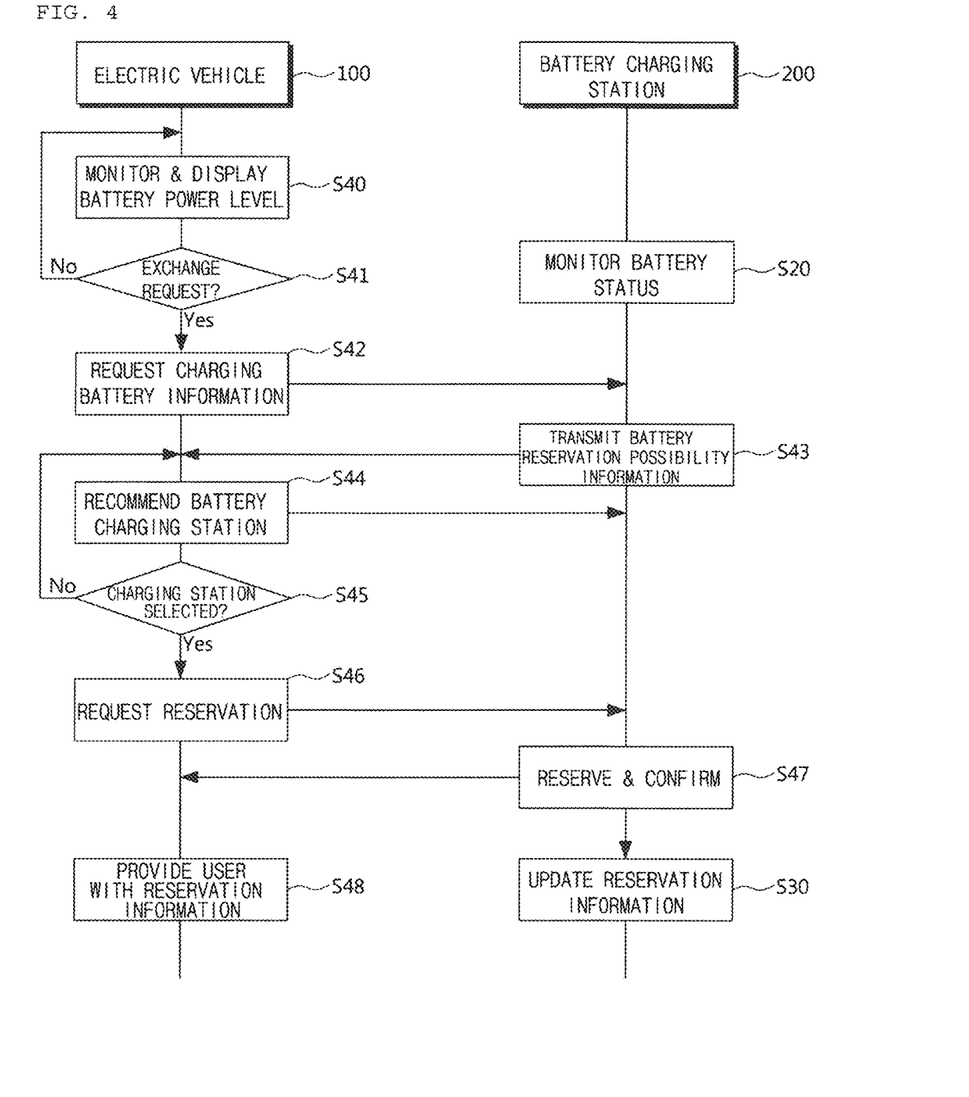
FIG. 4 is a flowchart of a battery exchange method in connection with an electric vehicle and a battery charging station according to a second embodiment of the present invention.

FIG. 4 is a flowchart of a battery exchange method in connection with an electric vehicle 100 and a battery charging station 200 according to a second embodiment of the present invention. The construction of the present embodiment is similar to that described with reference to FIGS. 1 and 2, and repeated description of the previous embodiment will be omitted herein.

Referring to FIG. 2, the electric vehicle 100 according to the present embodiment further includes a user input unit 140. The user input unit 140 is adapted to receive the user's input, and can be implemented by various user interface means, such as buttons, touch screens, joysticks, user menu programs, etc.

Referring to FIG. 4, the electric vehicle 100 detects the battery power level and displays it to the user (S40). The battery charging station 200 monitors the type of batteries stored in the battery storage unit 210, their amount, charging state, etc. and updates relevant information in the database (S20).

The user can make a battery exchange request through the user input unit 140 of the electric vehicle 100, based on consideration of the battery power level, etc. (S41).

The electric vehicle 100, in response to the user's input, requests a battery charging station 200, which exists along the route of travel, to provide information regarding whether reservation is possible or not (S42). When the user makes no exchange request, the electric vehicle 100 can automatically proceed to step S42, when the power level is below a threshold, as in the case of the first embodiment.

The battery charging station 200, in response to the information request of the electric vehicle 100, extracts battery status information stored in the database unit 230 and transmits information regarding whether reservation is possible or not for the corresponding battery type to the electric vehicle 100 (S43).

The electric vehicle 100, after receiving the information regarding whether reservation is possible or not from the battery charging station 200, recommends a reservable charging station to the user (S44).

For example, when the electric vehicle 100 has asked a battery charging station 200, which comes next along the route of travel, about whether reservation is possible or not and then received a reply that there is an available battery and thus reservation is possible, the electric vehicle 100 recommends the corresponding battery changing station 200 to the user and asks whether he/she wants to reserve it or not.

For another example, when the electric vehicle 100 has asked three charging stations, which are close along the route of travel, whether reservation is possible or not and then received replies from two of them that there is an available battery and thus reservation is possible, the electric vehicle 100 recommends the corresponding battery charging stations 200 to the user. It is also possible to inform the user of the battery charging station 200, which has replied that there is no fully-charged battery available, by displaying the fact. For example, when the battery charging station 200 has replied that there is no battery available because no battery has been fully charged, the electric vehicle informs the user of how long it will take to fully charge the battery, etc.

It is possible to display the recommended charging stations on the map so that the user can easily locate them. Furthermore, besides the location, it is also possible to display the ongoing battery exchange in the corresponding charging station, reservation particulars, etc. so that the user can select the least crowded charging station.

When the user selects the recommended battery charging station 200 or chooses one from them (S45), the electric vehicle 100 transmits a reservation command to the corresponding battery charging station 200 (S46).

The user may select a battery charging station 200 having no fully-charged battery. For example, when the user is informed that the battery charging station 200 currently has no fully-charged battery but is also informed of how long it will take to fully charge a battery, the user may want to wait and exchange the battery at the corresponding battery charging station 200. In such a case, the user can select the corresponding battery charging station 200 and make reservation.

The battery charging station 200, upon receiving the reservation command, sets up a reservation to exchange the battery of the corresponding electric vehicle 100 and transmits a confirmation signal to the electric vehicle 100 (S47). The electric vehicle 100 informs the user of the name, location, etc. of the reserved battery charging station 200 (S48) to guide the battery exchange.

The battery charging station 200 stores the reservation information in the database unit 230 to update information regarding the battery status and reservation particulars (S20).

The present embodiment enables the user to reserve exchange and select a battery charging station 200 as desired, thereby improving user convenience.

An example of application of the above-mentioned process of FIG. 4 to an electric bus traveling along a predetermined line will now be described with reference to FIG. 4 again. The battery charging station 200 is installed at a bus stop so that batteries can be exchanged while passengers are getting on or off the bus.

The electric bus monitors the battery power level and displays it to the driver (S40). The driver checks the battery power level and presses a menu button of the user input unit 140 to request battery exchange (S41). The control unit 130 then asks a battery charging station 200, which is located at the next bus stop along the line, whether battery exchange is possible or not (S42). The control unit 130 may either ask the closest battery charging station 200 or ask a number of battery charging stations 200, which come next the current location along the line, the same inquiry.

The electric bus, upon receiving a reply regarding whether reservation is possible or not from the battery charging station 200 (S43), informs the user of reservable battery charging stations 200 by displaying them (S44).

When the user selects a desired battery charging station from recommended battery charging stations 200 (S45), a reservation request is transmitted to the corresponding battery charging station 200 (S46).

It is possible that the user does not determine a battery charging station 200, but the control unit 130 of the electric vehicle determines a suitable battery charging station 200 and informs the user of it, as in the case of FIG. 3. The electric bus can determine a battery charging station 200 in various manners: it can determine a battery charging station 200 located at the closest next bus stop along the line or let the user determine it, etc.

Figure 5:
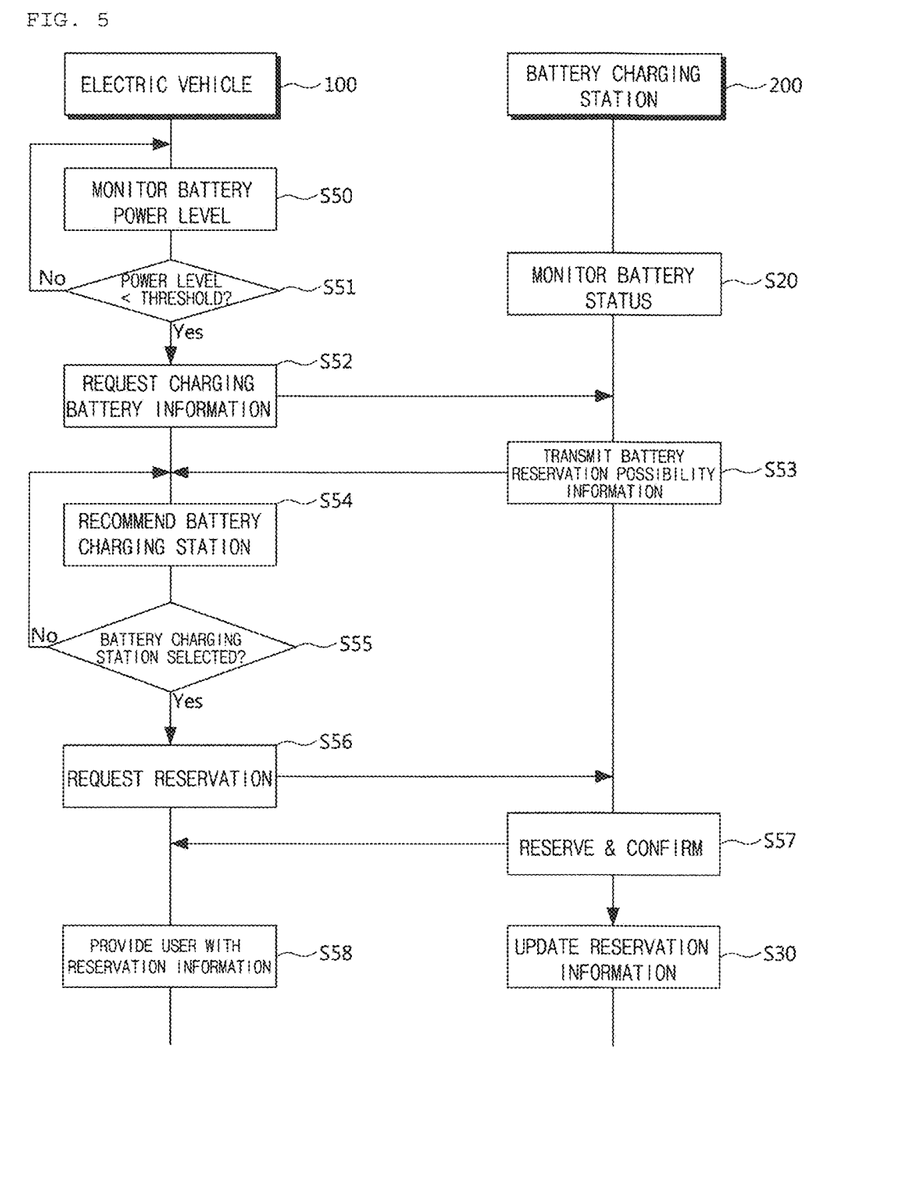
FIG. 5 is a flowchart of a battery exchange method in connection with an electric vehicle and a battery charging station according to a third embodiment of the present invention.

FIG. 5 is a flowchart of a battery exchange method in connection with an electric vehicle 100 and a battery charging station 200 according to a third embodiment of the present invention. The construction of the present embodiment is similar to that shown in FIGS. 1 and 2, and repeated description of the previous embodiment will be omitted herein.

Referring to FIG. 5, the electric vehicle 100 detects the battery power level and displays it to the user (S50). The battery charging station 200 monitors the type of batteries stored in the battery storage unit 210, their amount, charging state, etc. and updates relevant information in the database (S20).

The electric vehicle 100, when the battery power level is below a threshold (S51), requests a battery charging station 200, which exists along the route of travel, to provide information regarding whether reservation is possible or not (S52).

The battery charging station 200, in response to the information request of the electric vehicle 100, extracts batter status information stored in the database unit 230 and transmits information regarding whether the corresponding battery type can be reserved or not to the electric vehicle 100 (S53).

The electric vehicle 100 receives information regarding whether reservation is possible or not from the battery charging station 200 and recommends a reservable battery charging station 200 to the user (S54).

When the user selects the recommended battery charging station 200 or selects one from them (S55), the electric vehicle 100 transmits a reservation command to the corresponding battery charging station 200 (S56).

The battery charging station 200, upon receiving the reservation command, sets up a reservation to exchange the battery of the corresponding electric vehicle 100 and transmits a confirmation signal to the electric vehicle 100 (S57). The electric vehicle 100 informs the user of the name, location, etc. of the reserved battery charging station 200 (S58) to guide the battery exchange.

The battery charging station 200 stores the reservation information in the database unit 230 to update information regarding the battery status and reservation particulars (S20).

According to the present embodiment, when the power level is below a threshold, the user is automatically provided with a recommendation of reservable battery charging stations 200 existing along the route of travel so that the user can select a desired battery charging station 200 conveniently.

Figure 6:
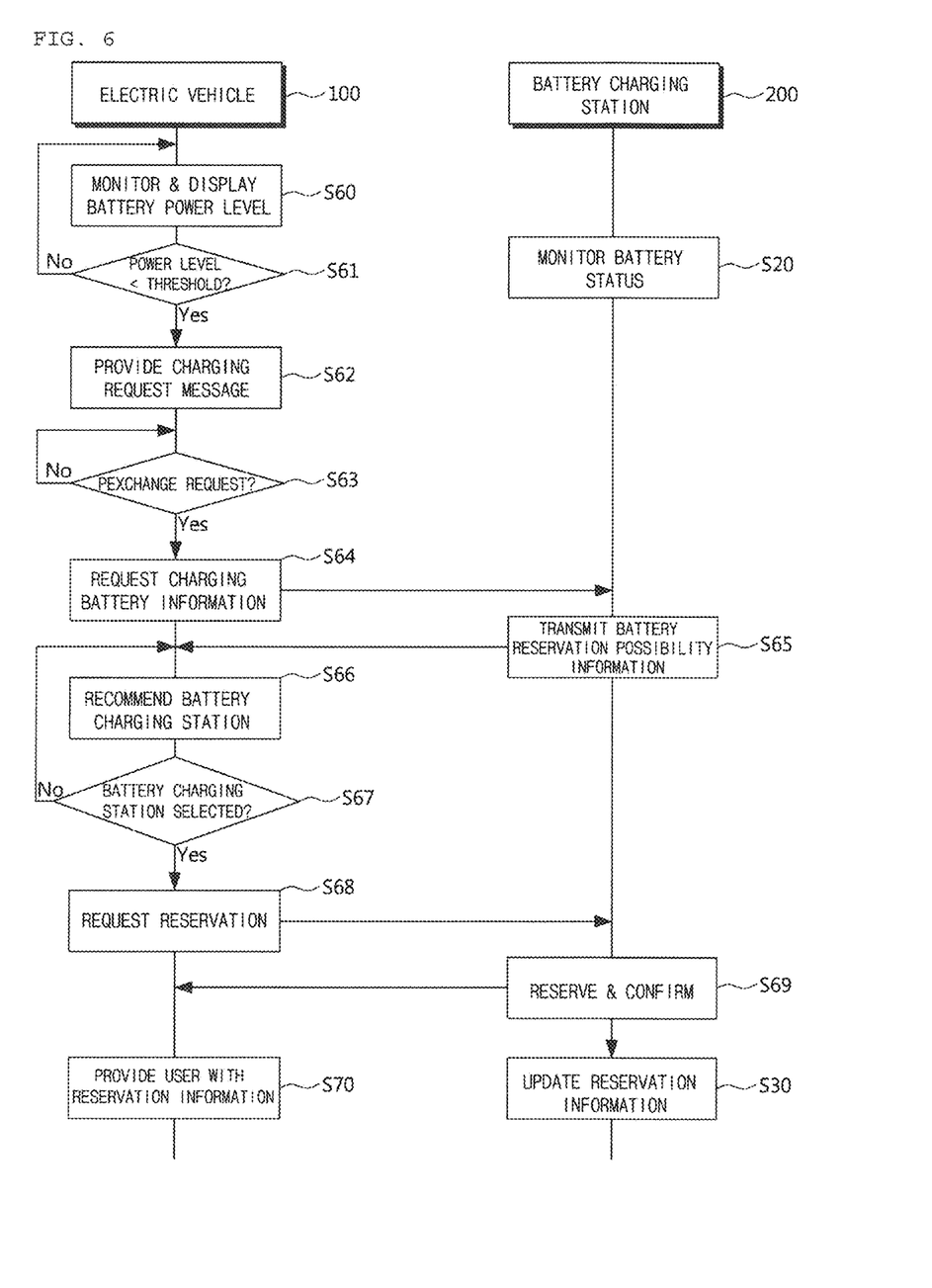
FIG. 6 is a flowchart of a battery exchange method in connection with an electric vehicle and a battery charging station according to a fourth embodiment of the present invention.

FIG. 6 is a flowchart of a battery exchange method in connection with an electric vehicle 100 and a battery charging station 200 according to a fourth embodiment of the present invention. The construction of the present embodiment is similar to that shown in FIGS. 1 and 2, and repeated description of the previous embodiment will be omitted herein.

Referring to FIG. 6, the electric vehicle 100 detects the battery power level and displays it to the user (S60). The battery charging station 200 monitors the type of batteries stored in the battery storage unit 210, their amount, charging state, etc. and updates relevant information in the database (S20).

The electric vehicle 100, when the battery power level drops below a threshold (S61), provides the user with a message requesting that the battery be charged through a display or a sound to guide exchange reservation (S62).

When the user checks the message and requests battery exchange (S63), the electric vehicle 100 requests a battery charging station 200, which exists along the route of travel, to provide information regarding whether reservation is possible or not (S64).

The battery charging station 200, in response to the information request of the electric vehicle 100, extracts battery status information stored in the database unit 230 and transmits information regarding whether the corresponding battery type can be reserved or not to the electric vehicle 100 (S65).

The electric vehicle 100 receives the information regarding whether reservation is possible or not from the battery charging station 200 and recommends a reservable battery charging station 200 to the user (S66).

When the user selects the recommended battery charging station 200 or selects one from them (S67), the electric vehicle 100 transmits a reservation command to the corresponding battery charging station 200 (S68).

The battery charging station 200, upon receiving the reservation command, sets up a reservation to exchange the battery of the corresponding electric vehicle 100 and transmits a confirmation signal to the electric vehicle 100 (S69). The electric vehicle 100 informs the user of the name, location, etc. of the reserved battery charging station 200 (S70) to guide the battery exchange.

The battery charging station 200 stores the reservation information in the database unit 230 to update information regarding the battery status and reservation particulars (S20).

According to the present embodiment, when the power level is below a threshold, the user is guided to charge the battery and provided with a recommendation of reservable battery charging stations 200 existing along the route of travel so that the user can select a desired battery charging station 200 conveniently.

The above-described embodiments can be combined with each other as long as they do not conflict with each other.

A process of entering a battery charging station 200 and exchanging the battery, by an electric vehicle 100, after reserving exchange, will now be described with reference to FIGS. 7-10. The fifth embodiment, which will now be described, can be combined with the above-described first to fourth embodiments, and repeated description of the same construction will be omitted herein.

Figure 7:
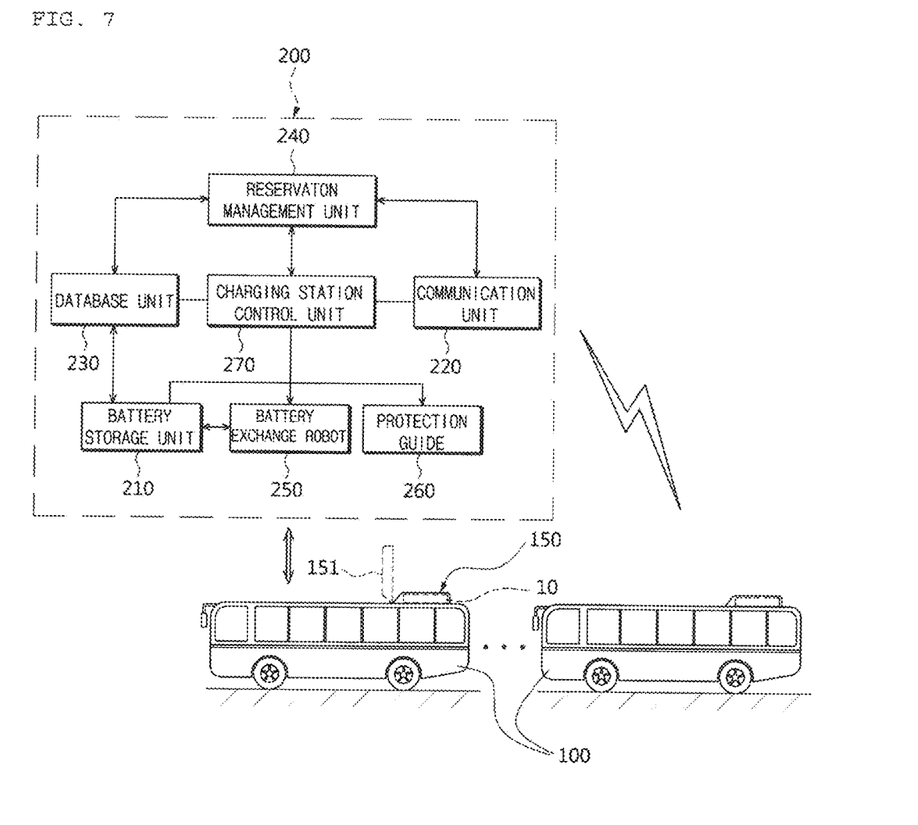
FIG. 7 is a block diagram of a battery exchange reservation system according to a fifth embodiment of the present invention.
Figure 8:
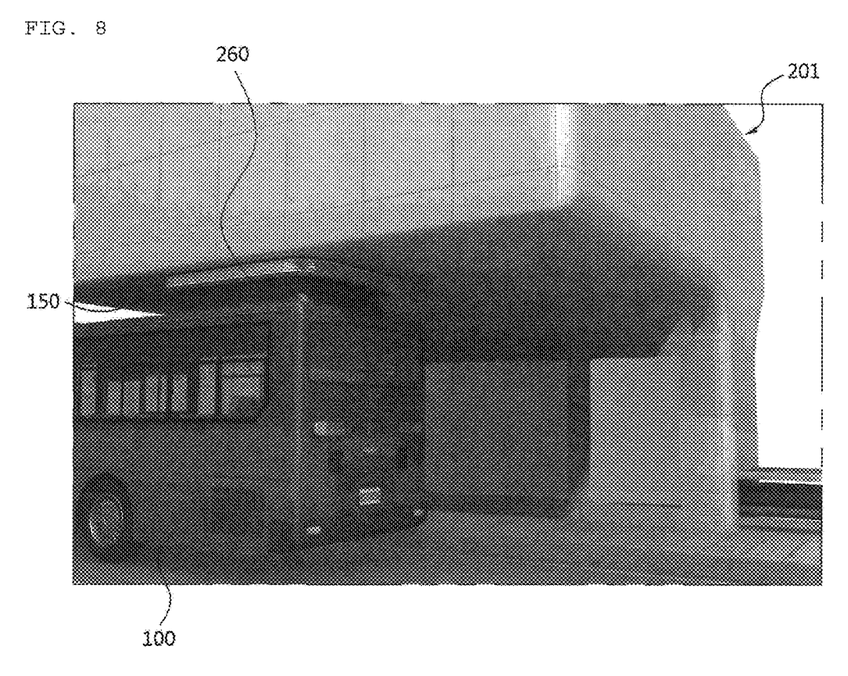
FIGS. 8 and 9 illustrate a schematic construction of a battery exchange reservation system for an electric vehicle.
Figure 9:
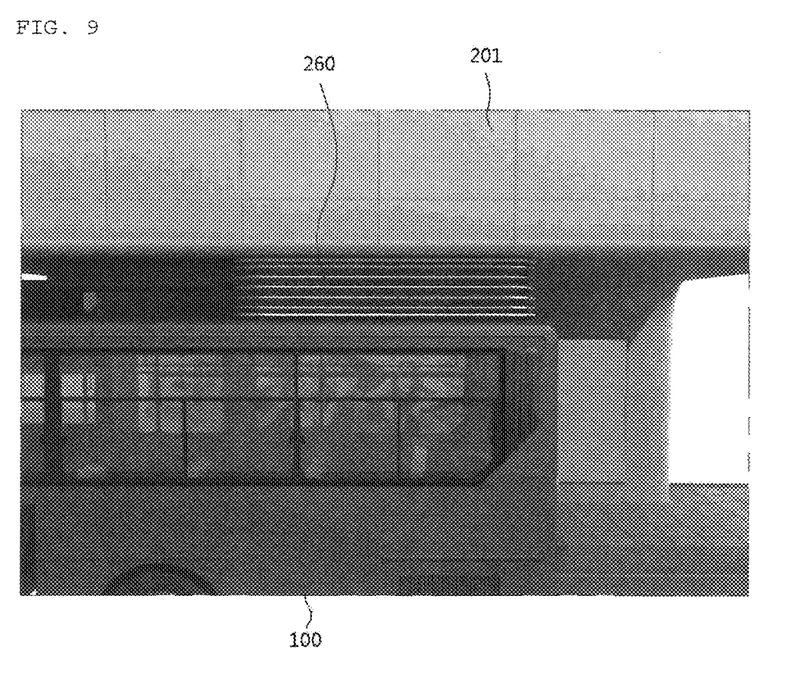

FIG. 7 is a block diagram of a battery exchange reservation system according to the fifth embodiment of the present invention, and FIGS. 8 and 9 illustrate a schematic construction of a battery exchange reservation system for an electric vehicle 100.

The battery exchange reservation system according to the present embodiment includes an electric vehicle 100 and a battery charging station 200.

The electric vehicle 100 includes a battery mounting module 150 on which a battery 10 is mounted. The battery mounting module 150 includes a door 151 installed on top of the electric vehicle 100 and adapted to be opened/closed.

The control unit 130 is adapted to open the door 151, when entering the battery charging station 200, and enable battery exchange.

The battery charging station 200 includes a battery storage unit 210, a communication unit 220, a database unit 230, a reservation management unit 240, a battery exchange robot 250, a protection guide 260, and a charging station control unit 270.

The battery storage unit 210, the battery exchange robot 250, and the protection guide 260 are provided on the main unit 201 of the battery charging station 200, and, as shown in FIGS. 2 and 3, the battery 10 of the electric vehicle 100 is also mounted on the top, so that the charging station main unit 201 is adapted to exchange the battery 10 on the top.

The battery charging station 200 has a protection guide 260 to seal the battery mounting module 150, which contains a battery, when the electric vehicle 100 enters so that no external environmental change can influence the battery exchange process. The protection guide 260 can be formed in any structure as long as it can effectively seal and protect the battery mounting module 150, which contains the battery 10, in the battery exchange process. In the present embodiment, the protection guide 260 is a corrugated tube which is contained inside the charging station main unit 201, which is unfolded and discharged towards the battery mounding module 150 during battery exchange, and which returns to the original position after the battery exchange process is completed.

The battery exchange robot 250 is installed in the charging station main unit 201 and adapted to exchange batteries, and any type of transfer robot available in industrial fields can be employed, as long as it can effectively exchange batteries.

For example, considering that the charging station main unit 201 according to the present embodiment has an approximately L-shaped configuration, the battery exchange robot 250 includes a battery transfer and mounting robot and a battery withdrawal and containing robot in conformity with the charging station main unit 201.

The charging station control unit 270 is adapted to control the battery exchange robot 250 and the protection guide 260 so as to exchange batteries, and can be implemented by a processor, a controller, and a control code.

Figure 10:
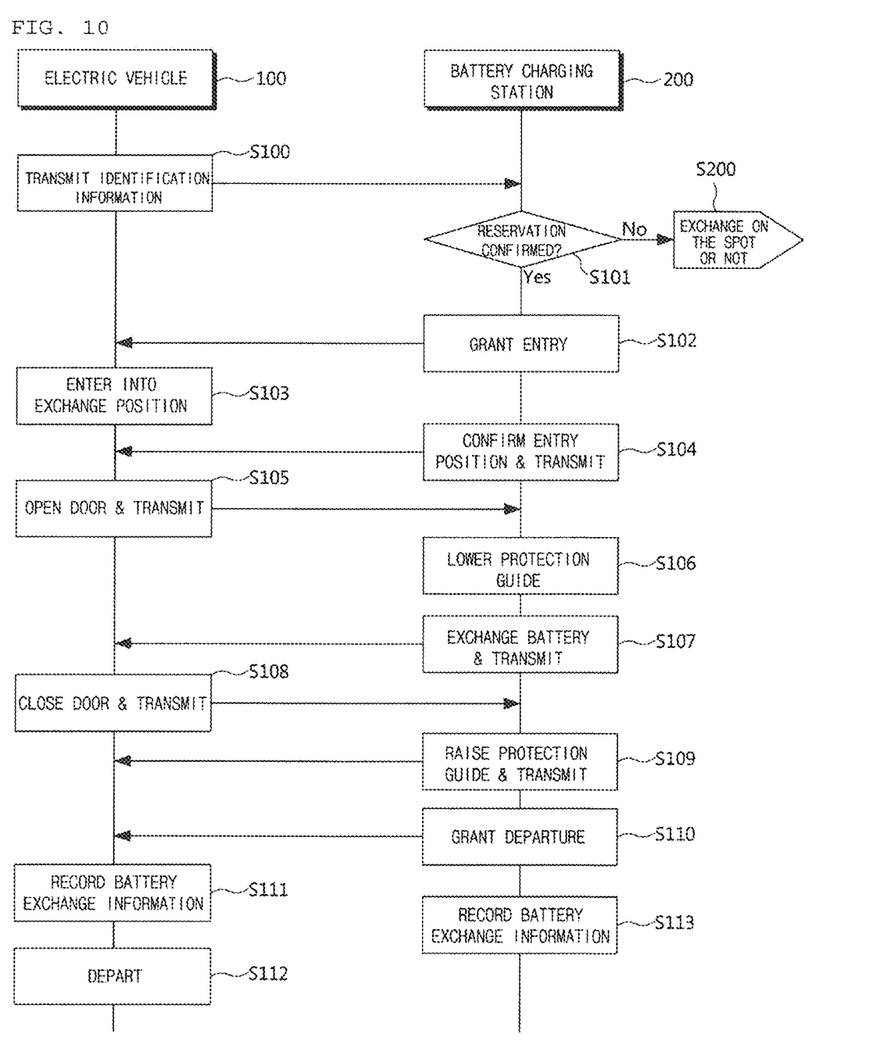
FIG. 10 is a flowchart of a battery exchange method by a battery exchange reservation system according to a fifth embodiment of the present invention.

A specific battery exchange method by the battery exchange reservation system for the electric vehicle 100 shown in FIGS. 7-9 will now be described with reference to FIG. 10. FIG. 10 is a flowchart of a battery exchange method by a battery exchange reservation system according to the fifth embodiment of the present invention.

The electric vehicle 100, when entering the battery charging station 200, transmits identification information to the battery charging station 200 (S100). The electric vehicle 100 can transmit reservation information together with the identification information. Transmission of the identification information and reservation information from the electric vehicle 100 to the battery charging station 200 can be performed at the request of the battery charging station 200 when the electric vehicle 100 enters it or, if necessary, by a transmission command from the user of the electric vehicle 100.

The charging station control unit 270 checks the identification information or the reservation information from the electric vehicle 100 to confirm whether the vehicle has made a reservation or not (S101). The confirmation can be done solely based on the transmitted information or by comparison with information stored in the database unit 230.

When it is confirmed that the vehicle has made a reservation, an entry grant signal is transmitted to the electric vehicle 100 (S102), so that the electric vehicle 100 enters into the exchange position (S103). When no reservation information is checked, the exchange process is performed according to whether exchange is to be performed on the spot without reservation (S200).

When the battery charging station 200 confirms that the electric vehicle 100 is in the right entry position, it transmits a conformation signal to the electric vehicle 100 (S104). The control unit 130 of the electric vehicle 100 commands the battery mounting module 150, on which a battery is mounted, to open the door 151 and sends a resulting confirmation signal to the battery charging station 200 (S105).

The charging station control unit 270 receives the confirmation signal and lowers the protection guide 260 (S106) so that the battery exchange process can be conducted stably without being exposed to the outside. The charging station control unit 270 controls the battery exchange robot 250 to remove a battery from the electric vehicle 100 and mount a fully-charged battery onto the battery mounting module 150, completes the battery exchange process, and transmits a completion signal to the electric vehicle 100 (S107).

The control unit 130 of the electric vehicle 100 closes the door 151 and transmits a confirmation signal to the battery charging station 200 (S108).

The charging station control unit 270 raises the protection guide 260 and sends a confirmation signal to the electric vehicle 100 (S109). The charging station control unit 270 then transmits a departure grant signal to the electric vehicle 100 (S110).

The electric vehicle 100 records battery exchange information in its internal memory and leaves the battery charging station (S112). The battery charging station also records battery exchange information (S113), and battery information and reservation information stored in the database unit 230 are updated.

According to an alternative embodiment of the present invention, the step (S105) of opening the door 151 of the electric vehicle 100 and the step (S106) of lowering the protection guide 260 of FIG. 10 can be reversed. Specifically, when the battery charging station confirms that the electric vehicle 100 is in the right entry position, it transmits a relevant confirmation signal to the electric vehicle 100 (S104), and lowers the protection guide 260 to seal the battery mounting module 150 (S106). The electric vehicle 100 then opens the door 151 of the battery mounting module 150 (S105), so that batteries are exchanged.

Those skilled in the art can understand that, although exemplary embodiments of the present invention have been illustrated and described, the embodiments can be modified without departing from the principle or idea of the present invention, which is defined by the accompanying claims and equivalents thereof.

The invention claimed is:

1. An electric vehicle battery exchange reservation system comprising:
   an electric vehicle comprising:
      a power level detection unit configured to detect a power level of a battery mounted on the electric vehicle,
      a communication unit configured to communicate with battery charging stations, communicate with an external source, and acquire information regarding traffic conditions along a travel route of the electric vehicle toward a battery charging station, and
      a control unit configured to transmit a battery exchange request message to one or more battery charging stations, which exist along the travel route of the electric vehicle, based on the detected battery power level and the travel route, when the battery power level drops below a threshold, receive a message including a battery exchange reservation information, an information regarding whether the battery exchange is possible or not, and a battery exchange information of the battery charging station from the one or more battery charging stations on the travel route, recommend a battery charging station, in which the battery of the electric vehicle can be exchanged, to the user based on the received message, and transmit a battery exchange reservation command to a selected battery charging station when the battery charging station is selected by the user through the user input unit; and the one or more battery charging stations each comprising:
   a battery storage unit configured to contain a chargeable battery mounted on the electric vehicle,
   a database unit configured to store information regarding the type, amount, and charging state of the battery contained in the battery storage unit and reservation particulars,
   a communication unit configured to communicate with the electric vehicle, and
   a reservation management unit configured to extract information regarding a reservable battery corresponding to the battery already mounted on the electric vehicle from the database unit, provide the electric vehicle with the extracted information, receive a reservation command from the electric vehicle, and update reservation information in the database unit,
wherein the battery charging station communicating with the communication unit exists along the travel route of the electric vehicle, transmits the message including the battery exchange reservation information, the information regarding whether the battery exchange is possible or not, and the battery exchange information of the battery charging station from the battery charging station on the travel route when the battery exchange request message is received from the electric vehicle, and updates information in the database unit when the battery exchange reservation command is received from the electric vehicle.

2. The electric vehicle battery exchange reservation system as claimed in claim 1, wherein
   the electric vehicle comprises an electric bus operated along a bus line,
   the battery charging station is installed at a bus stop in the bus line, and
   the control unit is configured to select the battery charging station, which is available in the bus line of the electric bus, as a reservation target.

3. A method of reserving exchange of a battery of an electric vehicle, comprising the steps of:
   detecting a power level of a battery mounted on an electric vehicle;
   asking, by the electric vehicle, one or more battery charging stations, which exists along a travel route of the electric vehicle, whether exchange reservation is possible or not, when the power level of the battery is below a threshold;
   transmitting, by a battery charging station, a message including a battery exchange reservation information, an information regarding whether the battery exchange is possible or not, and a battery exchange information of the battery charging station to the electric vehicle, when the battery exchange request message is received;
   recommending, by the electric vehicle, the battery charging station, in which the battery of the electric vehicle can be exchanged, to a user based on the received message;
   inputting, by the user input unit, a selection of a battery charging station;
   transmitting, by the electric vehicle, a battery exchange reservation command to the selected battery charging station by the user input unit; and
   updating, by the selected battery charging station, battery exchange reservation information.

4. The method of reserving exchange of a battery of an electric vehicle as claimed in claim 3, further comprising the steps of:
   confirming, by the battery charging station, whether the electric vehicle, when entering into the battery charging station, has made reservation or not based on identification information regarding the electric vehicle;
   transmitting an entry grant signal to the electric vehicle when reservation information regarding the electric vehicle exists;
   confirming an entry position, when the electric vehicle enters into the battery charging station, and transmitting a confirmation signal to the electric vehicle;
   opening a door of a battery mounting module installed on top of the electric vehicle;
   sealing the battery mounting module by lowering a protection guide installed in the battery charging station; and
   exchanging the battery.

5. The method of reserving exchange of a battery of an electric vehicle as claimed in claim 3, further comprising the steps of:
   confirming, by the battery charging station, whether the electric vehicle, when entering into the battery charging station, has made reservation or not based on identification information regarding the electric vehicle;
   transmitting an entry grant signal to the electric vehicle when reservation information regarding the electric vehicle exists;
   confirming an entry position, when the electric vehicle enters into the battery charging station, and transmitting a confirmation signal to the electric vehicle;
   sealing the battery mounting module by lowering a protection guide installed in the battery charging station;
   opening a door of a battery mounting module installed on top of the electric vehicle; and
   exchanging the battery.

* * * * *